May 8, 1945.  N. J. CREEDON  2,375,214
MULTIPLE PURPOSE ADAPTER AND SUPPORTING DEVICE FOR CAMERAS
Filed Feb. 14, 1944  2 Sheets-Sheet 1
Fig. 1.
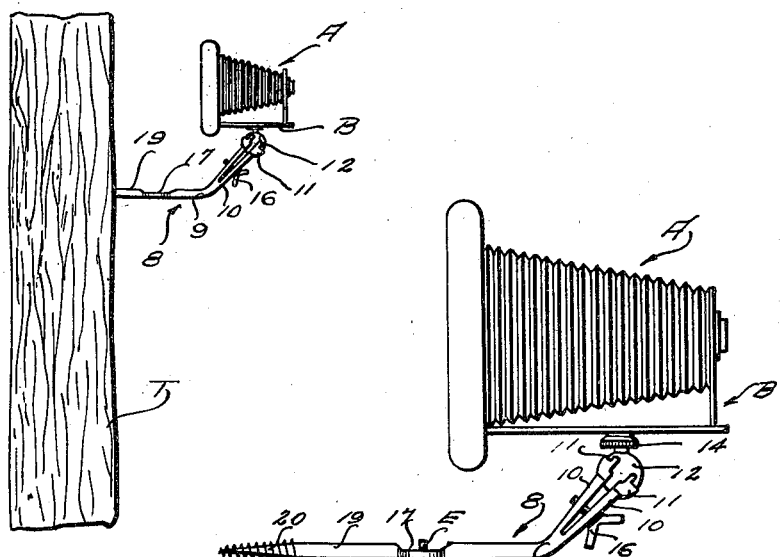
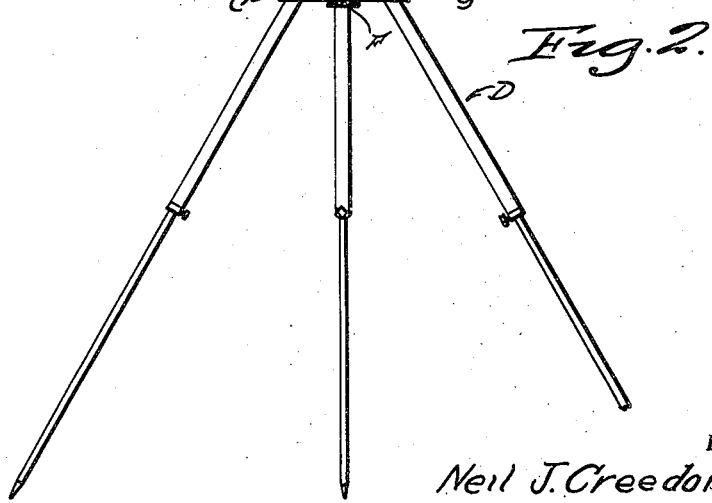
Fig. 2.
Inventor
Neil J. Creedon
By *Clarence A. O'Brien and Harvey B. Jackson*
Attorneys May 8, 1945. N. J. CREEDON 2,375,214
MULTIPLE PURPOSE ADAPTER AND SUPPORTING DEVICE FOR CAMERAS
Filed Feb. 14, 1944 2 Sheets-Sheet 2
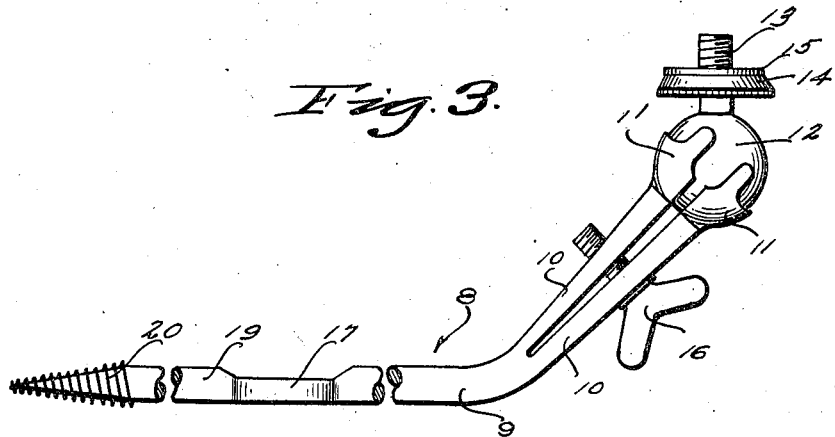
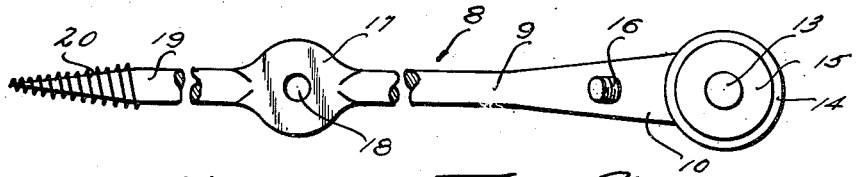
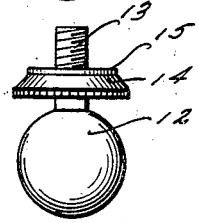 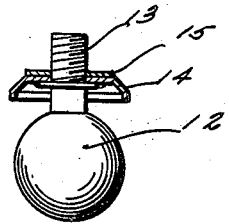
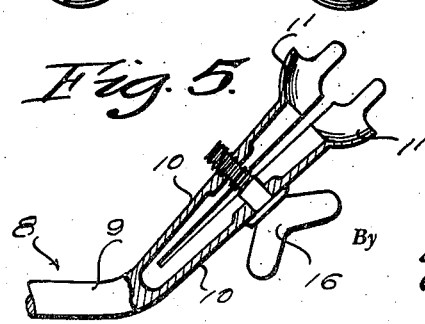
Inventor
Neil J. Creedon
By Clarence A. O'Brien
and Harvey B. Jacobson
Attorneys Patented May 8, 1945

2,375,214

UNITED STATES PATENT OFFICE 2,375,214

MULTIPLE PURPOSE ADAPTER AND SUPPORTING DEVICE FOR CAMERAS

Neil J. Creedon, Glens Falls, N. Y.

Application February 14, 1944, Serial No. 522,296

2 Claims. (Cl. 248—181)

This invention relates to a novel and improved device for accommodating and supporting cameras and the like and it consists in a so-called multiple purpose adapter bracket of a specially designed form, the same being such as to serve in conjunction with a conventional tripod or to serve independently for anchorage on a tree, post or equivalent make-shift base.

In carrying out the principles of the invention I have devised a comparatively simple and readily usable adapter bracket which is characterized by means at one end for attachment to a tree or the like, means intermediate its ends susceptible of attachment to a regular styled tripod, and means at the opposite end for universal connection with the camera.

Other features and advantages of the invention will become more readily apparent from the following description and the accompanying illustrative drawings.

In the drawings, wherein like reference numerals are employed to designate like elements or parts throughout the same:

Figure 1 is a side elevational view of the novel adapter bracket or fixture showing the manner in which it is anchored upon a tree and also illustrating the manner in which the conventional camera is perched and adjustably mounted thereon.

Figure 2 is a slightly enlarged view illustrating how the device or bracket is attached to and mounted on a conventional camera tripod.

Figure 3 is a side elevational view of the adapter bracket per se.

Figure 4 is a top plan view of the construction illustrated in Figure 3.

Figure 5 is a fragmentary detail sectional and elevational view disclosing, to advantage, the specific construction of the adjustable ball clamping or gripping jaws.

Figures 6 and 7 are detail elevational and sectional views of the ball jointing and camera fastening unit.

The improved bracket, in a unitary sense, is denoted by the numeral 8 and comprises a stem-like body portion 9. This has a laterally offset end portion which is longitudinally slitted to define a pair of resilient limbs 10, these terminating in part-spherical jaws 11 having fingers and otherwise shaped as shown to accommodate the ball jointing member 12. This member 12 is provided with a screw-threaded stud 13 for attachment to the camera A by way of the accommodation frame B. A ring clamping nut 14 is threaded on the stud and has a suitable marginal and knurled finger-grip. The numeral 15 designates a fiber washer surrounding the stud and resting on the nut 14. A wing-bolt 16 is threaded through holes in the limbs 10 to adjust said parts toward and from each other to effect the desired frictional clamping action between the jaws and ball. The intermediate portion of the bracket is flattened into disk-like form as indicated at 17 and centrally apertured as at 18. This renders the bracket adaptable for attachment to the table C of the conventional tripod D by way of the usual fastening elements E and F. That portion of the structure extending beyond the attaching disk 17 constitutes the shank 19 and this is tapered and screw-threaded as at 20 whereby to provide a screw susceptible of anchorage on a tree T. This as brought out to advantage in Figure 1.

It will be noticed that the shank 19 is in alignment with the body stem 9 as well as the intervening disk-like portion 17 to permit the device to fit firmly on the table or head of the tripod D as brought out to advantage in Figure 2. The clamping and ball and socket means is sufficiently offset in a lateral direction to provide desired clearance and to effect convenient adjustment by angling, of the camera A.

An adapter fixture of this type lends itself admirably well for use either on a tree or a tripod, or it can be, obviously, on a post, a building wall, fence or the like. It is sufficient strength and dimensions to permit the screw-threaded shank to be easily and readily anchored in place. It functions as a reliable and satisfactory support to hold the camera in various adjusted angular position. By adopting slight changes in the outer end of the structure it can be rendered equally serviceable for use in connection with transit, levels and analogous instruments and devices. The device as a unit is quite simple and economical and, therefore, meets the general demands of the trade as well as the user.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. An adapter and supporting bracket of the class described comprising a structure having means at one end for anchorage on a tree or the like, means at the opposite end to adjustably fasten a camera or the like thereon, and means intermediate its ends for adjustable and detachable connection with the head of a conventional camera tripod.

2. A special adapter bracket for supporting a camera or the like comprising a body fashioned into a tapered screw-threaded shank at one end, a stem-like part at the opposite end, said last-named end being formed into resilient limbs terminating in jaws, that portion of the body between the shank and stem being flattened into disk-like form and centrally apertured, said limbs having screw-threaded holes, a bolt passing through said holes, a ball joint element mounted between said jaws and having a screw-threaded stud and a clamping nut on said stud.

NEIL J. CREEDON.